(12) United States Patent
Jirmo et al.

(10) Patent No.: US 12,285,825 B2
(45) Date of Patent: Apr. 29, 2025

(54) NON-AQUEOUS SOLDER FLUX COMPOSITION

(71) Applicant: STEPAN COMPANY, Northfield, IL (US)

(72) Inventors: Liban Jirmo, Chicago, IL (US); Ronald A. Masters, Glenview, IL (US)

(73) Assignee: STEPAN COMPANY, Northfield, IL (US)

( * ) Notice: Subject to any disclaimer, the term of this patent is extended or adjusted under 35 U.S.C. 154(b) by 679 days.

(21) Appl. No.: 17/622,684

(22) PCT Filed: Feb. 27, 2020

(86) PCT No.: PCT/US2020/020062
§ 371 (c)(1),
(2) Date: Dec. 23, 2021

(87) PCT Pub. No.: WO2021/015821
PCT Pub. Date: Jan. 28, 2021

(65) Prior Publication Data
US 2022/0226940 A1    Jul. 21, 2022

Related U.S. Application Data

(60) Provisional application No. 62/975,442, filed on Feb. 12, 2020, provisional application No. 62/935,286, (Continued)

(51) Int. Cl.
*B23K 35/36* (2006.01)
*B23K 35/362* (2006.01)

(52) U.S. Cl.
CPC ........ *B23K 35/3615* (2013.01); *B23K 35/362* (2013.01)

(58) Field of Classification Search
None
See application file for complete search history.

(56) References Cited

U.S. PATENT DOCUMENTS

| 2,687,362 A | 8/1954 | Rueggeberg |
| 4,151,015 A | 4/1979 | Cooper |

FOREIGN PATENT DOCUMENTS

| CN | 1088865 A | 7/1994 |
| CN | 101758337 A | 6/2010 |

(Continued)

OTHER PUBLICATIONS

Chinese Office Action (including English translation) issued in App. No. CN20208047314, dated Dec. 13, 2022, 11 pages.

(Continued)

*Primary Examiner* — Jenny R Wu
(74) *Attorney, Agent, or Firm* — DILWORTH IP, LLC

(57) ABSTRACT

Non-aqueous solder flux compositions are disclosed. In some aspects, the compositions comprise: (a) an alkylbenzene sulfonic acid or an acidic phosphate ester; and (b) an alkanolamide, an ethoxylated alkanolamide, an alkanolamine, or an ethoxylated amine. Methods of making solder flux compositions and methods of using the compositions as components of tacky solder fluxes are described. The solder flux compositions have excellent wettability, oxide removal capability, and rheological characteristics for high-speed, pick-and-place manufacturing processes and can be made from a simple combination of two components, thereby avoiding the need for solvents, polymeric thickeners, and other components of traditional tacky solder fluxes.

7 Claims, 14 Drawing Sheets

Related U.S. Application Data filed on Nov. 14, 2019, provisional application No. 62/924,458, filed on Oct. 22, 2019, provisional application No. 62/912,391, filed on Oct. 8, 2019, provisional application No. 62/878,457, filed on Jul. 25, 2019.

(56) References Cited

FOREIGN PATENT DOCUMENTS

| | | | |
|---|---|---|---|
| CN | 105813795 | A | 7/2016 |
| CN | 107717262 | A | 2/2018 |
| CN | 108453436 | A | 8/2018 |
| CN | 108459436 | | 8/2018 |
| JP | 2003089676 | A | 3/2003 |
| JP | 20030089676 | | 3/2003 |
| JP | 2017148868 | A | 8/2017 |
| WO | 2015028813 | | 3/2015 |

OTHER PUBLICATIONS

Written Opinion issued in App. No. SG11202114303Y, dated Jun. 22, 2023, 8 pages.

Chinese Notification of Granting Patent Right and Going through the Formalities of Registration (including English translation) issued in App. No. CN20208047314, dated Aug. 25, 2023, 6 pages.

NON-AQUEOUS SOLDER FLUX COMPOSITION

FIELD OF THE INVENTION

The invention relates to compositions useful as tacky fluxes for soldering electronic components.

BACKGROUND OF THE INVENTION

Electronic circuit boards are manufactured using high-speed "pick-and-place" machines. The machines shear a layer of tacky solder flux onto a rapidly moving oscillating plate. During each cycle, a robot arm touches a part to the flux-coated plate, then places the part onto the circuit board. Current formulas in the industry use fluxes that include, among other components, glycol ether solvents, polymeric thickeners, and acidic modifiers. The thickened compositions are tacky gels that become thin when sheared but must recover viscosity when shearing is discontinued.

As manufacturing speeds have increased, fluxes based on conventional polymeric thickeners have been unable to keep pace. Although these fluxes thin with shearing, they fail to recover full viscosity rapidly, i.e., within milliseconds, when shear stops, perhaps because of entanglement of large chains of the polymeric thickener. This hysteresis effect is preferably minimized or avoided.

Desirable tacky solder fluxes will have a characteristic rheological profile, which can be investigated by dynamic shear rheometry. Additionally, the flux should recover most or all of its zero-shear viscosity when shear is removed, i.e., there should be little or no "sag" through multiple cycles of shear thinning and relaxation.

Tacky solder flux compositions usually contain organic solvents and they do not contain added water, as this is detrimental when the circuit board enters a high-temperature reflow oven to melt the solder. However, finding a balance of organic solvent, thickener, and active components that can deliver the right rheology profile has proved difficult.

Conventional solder fluxes tend partially to evaporate, typically about a 50 wt. % loss, at a processing temperature of about 250° C. The amount of evaporation can be controlled somewhat by adjusting the boiling point and concentration of the solvent. For some applications, however, it may be desirable to retain a larger proportion of the solder flux at 250° C. or higher temperatures than is normally the case with a solvent-based flux. Manufacturers would favor added flexibility from fluxes that could tolerate higher processing temperatures.

Desirably, tacky solder fluxes can also wet metal surfaces effectively and remove oxide impurities.

The industry would benefit from the availability of improved tacky solder fluxes. A desirable tacky solder flux would be non-aqueous, cost-effective, have good wettability capability, and have a rheological profile suitable for use in a high-speed, pick-and-place manufacturing process. Valuable fluxes could be tailored to achieve a desirable evaporation profile. Ideally, the formulation would be easy to formulate using readily available materials.

SUMMARY OF THE INVENTION

In some aspects, the invention relates to non-aqueous solder flux compositions.

In one aspect, the composition comprises: (a) 40 to 60 wt. % of an alkylbenzene sulfonic acid; and (b) 40 to 60 wt. % of an alkanolamide, an ethoxylated alkanolamide, an alkanolamine, or an ethoxylated amine, where the wt. % amounts are based on the combined amounts of (a) and (b).

In another aspect, the non-aqueous solder flux composition comprises: (a) 40 to 60 wt. % of an acidic phosphate ester; and (b) 40 to 60 wt. % of an alkanolamide, an ethoxylated alkanolamide, an alkanolamine, or an ethoxylated amine, where the wt. % amounts are based on the combined amounts of (a) and (b).

In yet another aspect, the non-aqueous solder flux composition consists essentially of: (a) 40 to 60 wt. % of an alkylbenzene sulfonic acid or an acidic phosphate ester; and (b) 40 to 60 wt. % of an alkanolamide, an ethoxylated alkanolamide, an alkanolamine, or an ethoxylated amine.

In other aspects, the compositions have little or no "sag," demonstrated by recovery of at least 90% of their zero-shear viscosities through multiple cycles of shear thinning and relaxation.

In some aspects, the solder flux composition has good wettability on metal coupons in an industry-standard wetting balance test when compared with a control flux. In some aspects, the flux compositions have improved ability to remove oxidation from an oxidized metal surface.

The invention includes methods of making solder flux compositions and methods of using the inventive compositions as components of tacky solder fluxes.

We surprisingly found that solder flux compositions having excellent wettability, oxide-removal capability, and rheological characteristics for high-speed, pick-and-place manufacturing processes can be made from a simple combination of two components thereby avoiding the need for solvents, polymeric thickeners, and other components of traditional tacky solder fluxes.

DETAILED DESCRIPTION OF THE INVENTION

Figure 1:
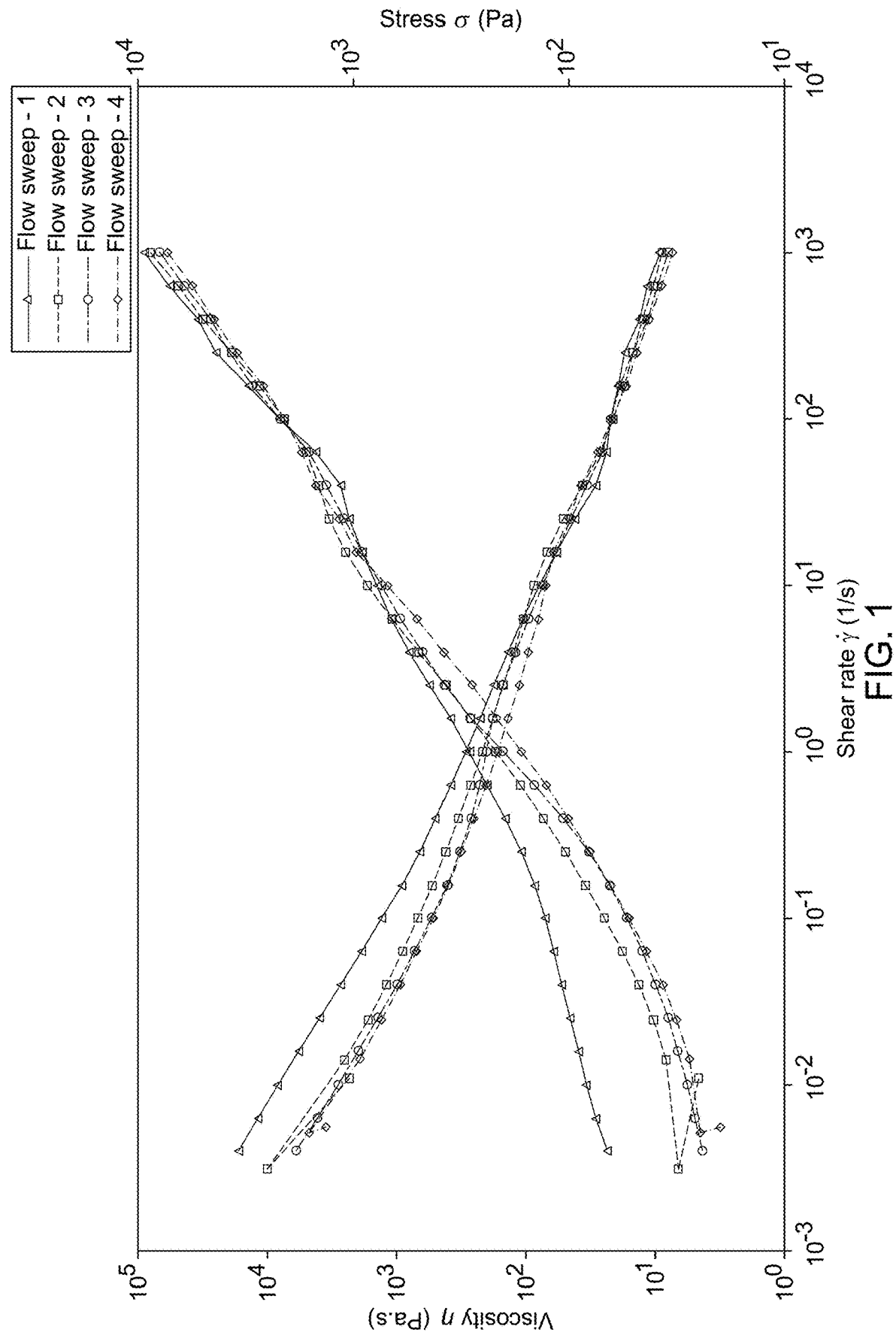
FIG. 1 is a plot from a dynamic shear rheometry (DSR) experiment measuring viscosity (Pa·s) versus shear rate ($s^{-1}$) for a 50:50 (wt/wt) blend of BIO-SOFT® S-126 (dodecylbenzene sulfonic acid) and TOXIMUL® TA-2 (tallowamine 2EO ethoxylate).
Figure 2:
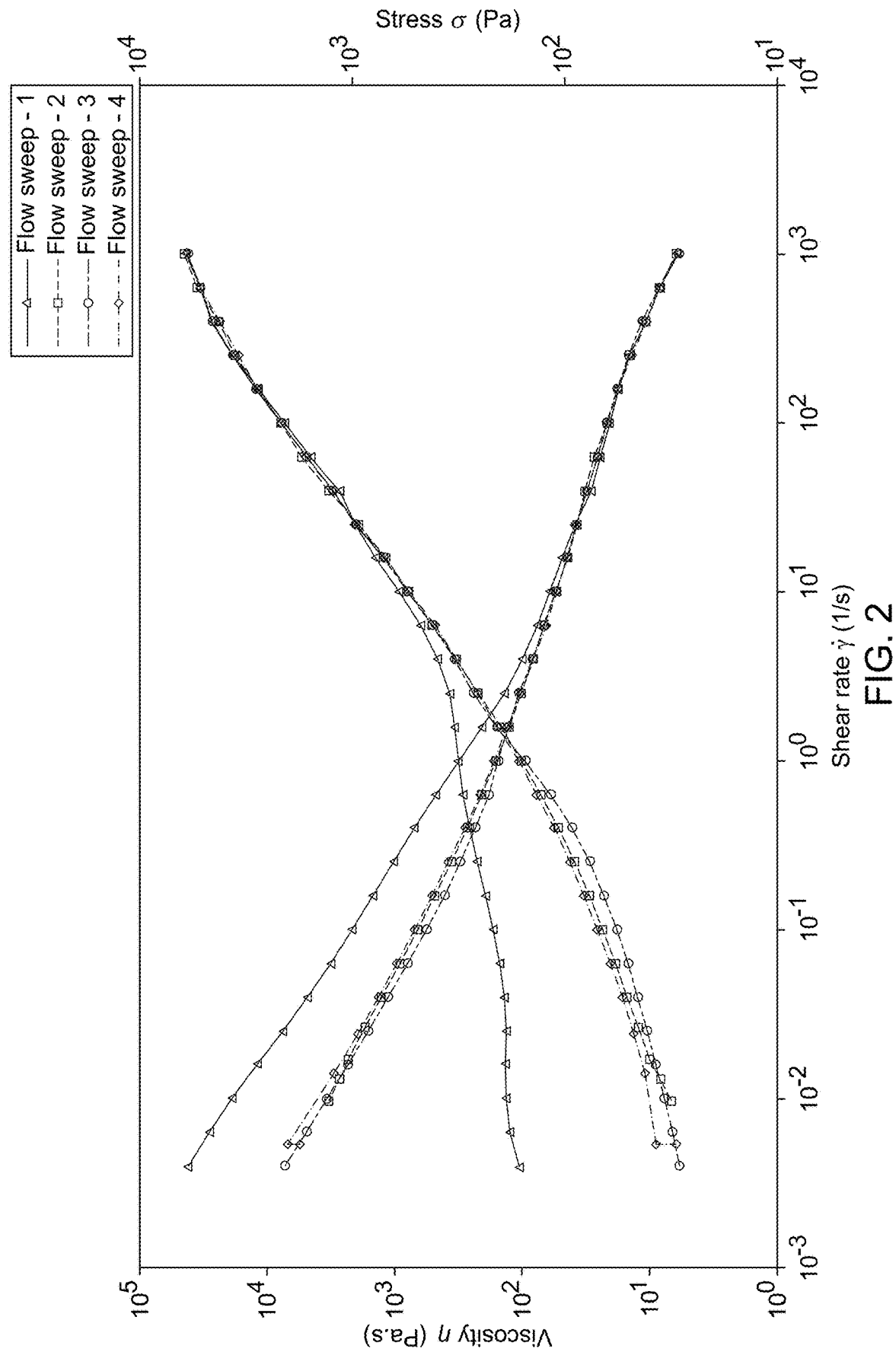
FIG. 2 is a plot from a similar DSR experiment for ZELEC® NK, an alcohol phosphate ester neutralized with an equivalent of diethanolamine.
Figure 3:
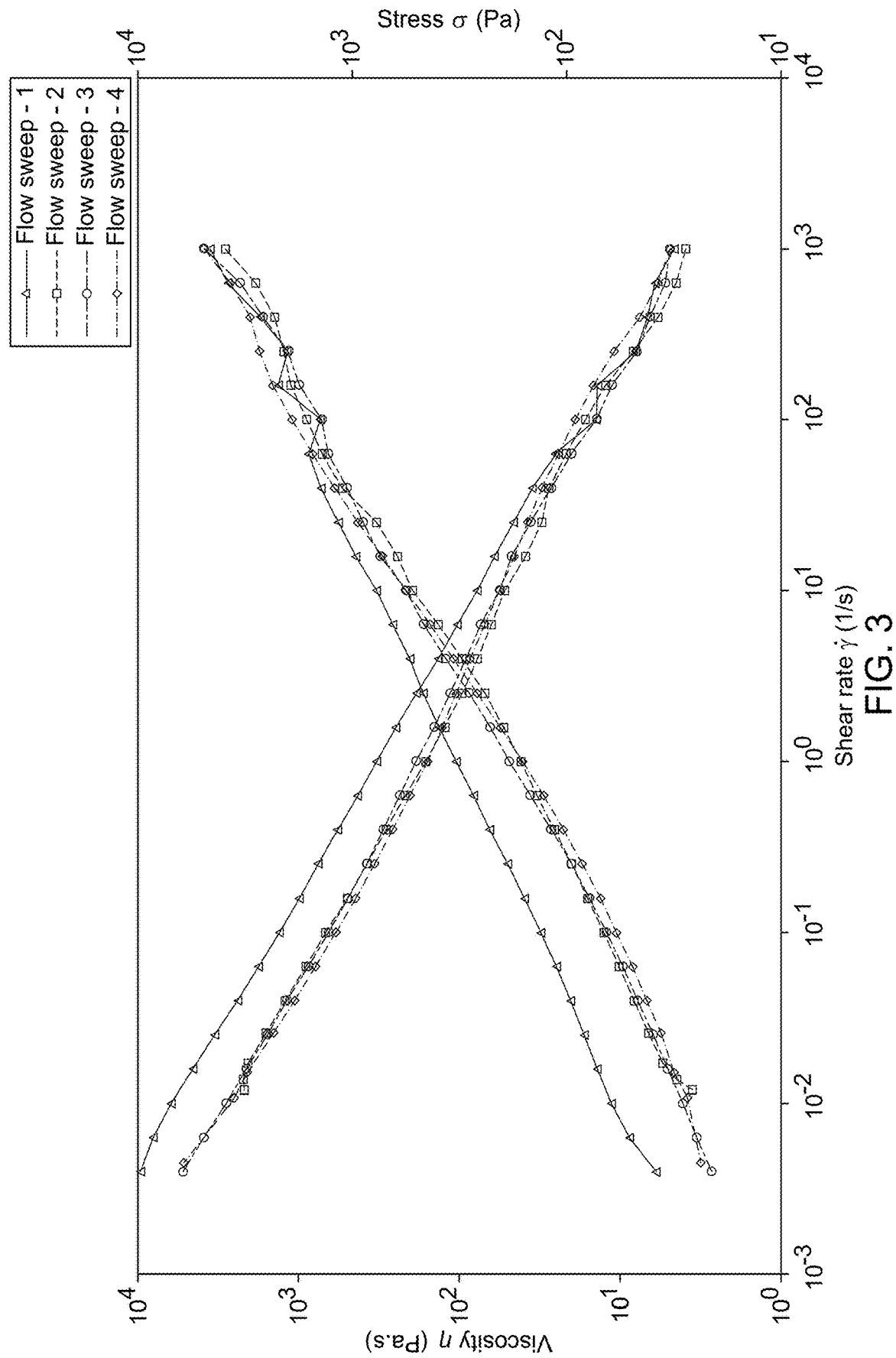
FIG. 3 is a plot from a similar DSR experiment for a 50:50 blend of ZELEC® UN, an acidic alcohol phosphate ester, and TOXIMUL® TA-2.
Figure 4:
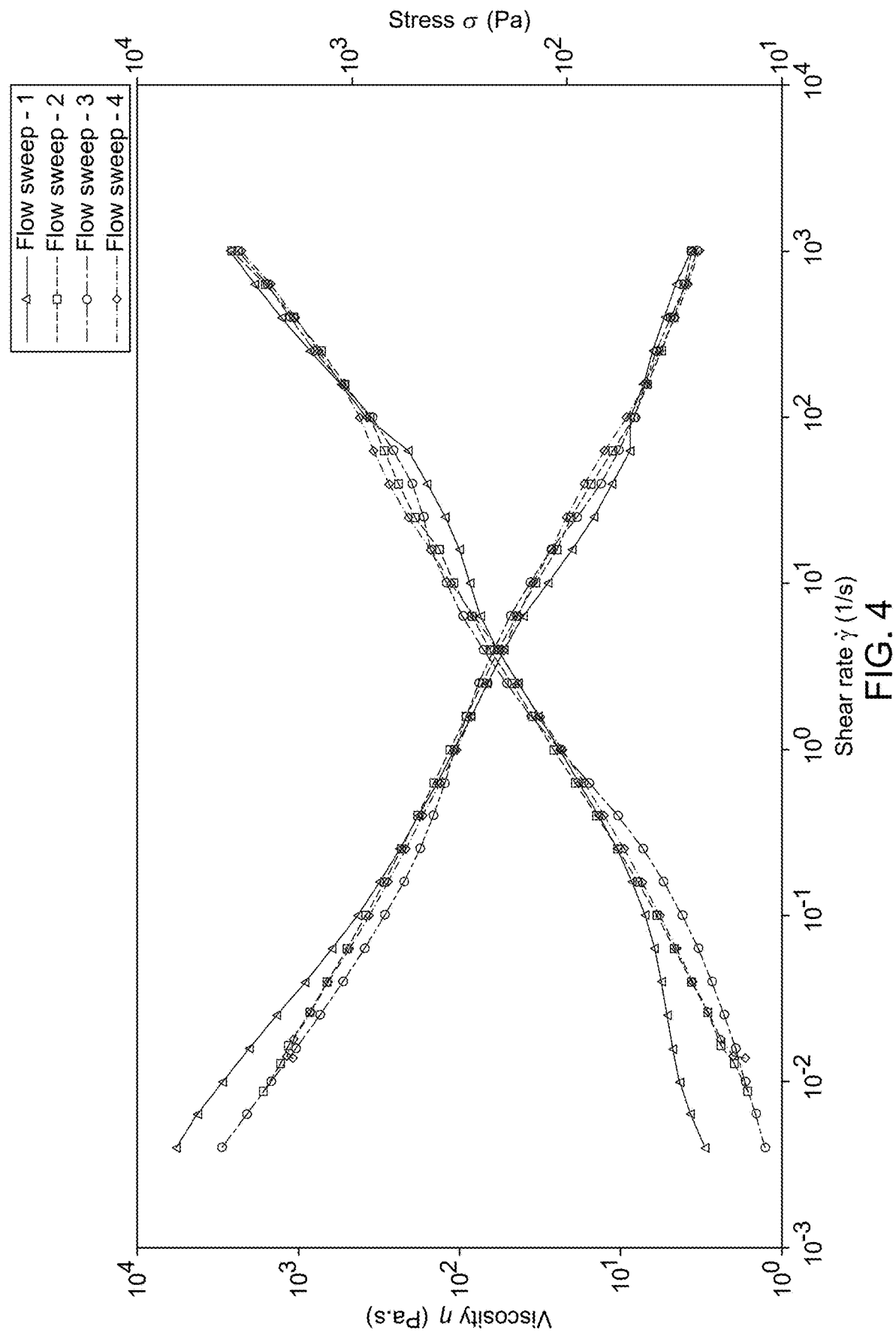
FIG. 4 is a plot from a similar DSR experiment for a 50:50 blend of CEDEPHOS® FA-600, an acidic alcohol phosphate ester, and TOXIMUL® TA-2.

Non-aqueous tacky solder flux compositions of the invention comprise (a) an alkylbenzene sulfonic acid or an acidic phosphate ester; and (b) an alkanolamide, an ethoxylated alkanolamide, an alkanolamine, or an ethoxylated fatty amine.

1. Alkylbenzene Sulfonic Acid or an Acidic Phosphate Ester

The acidic component of the non-aqueous solder flux is an alkylbenzene sulfonic acid or an acidic phosphate ester. Preferred alkylbenzene sulfonic acids have one or more—preferably one—linear or branched $C_1$-$C_{18}$ alkyl groups. In some aspects, the alkylbenzene sulfonic acid has a $C_1$-$C_4$ alkyl group, as in p-toluenesulfonic acid, methylbenzene sulfonic acid, p-t-butylbenzene sulfonic acid, or the like. p-Toluenesulfonic acid is available from Stepan Company as STEPANATE® PTSA.

In other aspects, a longer-chain alkyl group, especially a linear or branched $C_6$-$C_{18}$ alkyl group, a $C_{10}$-$C_{16}$ alkyl group, or a $C_{12}$-$C_{14}$ alkyl group is present. Commercially available alkylbenzene sulfonic acids of this type include Stepan's SULFONIC® 100 (branched $C_{12}$ alkyl) as well as Stepan's BIO-SOFT® S-101, BIOSOFT® S-120, BIO-SOFT® S-126 and BIOSOFT® AS-100 products. Alkylbenzene sulfonic acids having $C_{12}$-$C_{14}$ alkyl groups, such as BIOSOFT® S-126, are particularly preferred.

Acidic phosphate esters suitable for use have one or more acidic hydrogens and may be monophosphates, diphosphates, or polyphosphates. They include alcohol phosphates, alcohol ethoxylate phosphates, and phenol ethoxylate phosphates.

Suitable acidic (or "un-neutralized") phosphate esters include alcohol phosphates and ethoxylated products that preferably have an average of 2 to 20 units, preferably 2 to 10 EO units or 2 to 5 EO units. In some aspects, the acidic phosphate ester is a phosphate ester of an ethoxylated isodecyl alcohol, an ethoxylated tridecyl alcohol, an ethoxylated tristyrylphenol, or an ethoxylated nonylphenol. Commercial phosphate ester products from Stepan include ZELEC® 2-EH, ZELEC® UN, and STEPAN® MWA-310; aliphatic alcohol phosphates such as CEDEPHOS® FA-600; nonylphenol ethoxylate phosphates such as STEPFAC® 8170, STEPFAC® 8171, STEPFAC® 8173, and STEPFAC® 8175; tridecyl alcohol ethoxylate phosphates such as STEPFAC® 8180, STEPFAC® 8181, STEPFAC® 8182, and POLYSTEP® P-12; tristyrylphenol ethoxylates such as STEPFAC® TSP-PE; and triethanolamine phosphate esters such as PETROSTEP® PE-70T. ZELEC® UN is particularly preferred. Suitable phosphate esters can also be synthesized from commercially available ethoxylated alcohols such as Stepan's MAKON® DA-4, MAKON® DA-6, MAKON® DA-9, and the like, using well-known methods.

In some aspects, the phosphate ester is provided in neutralized form wherein the neutralizing agent is an alkanolamine or an ethoxylated amine. One commercial example is Stepan's ZELEC® NK, wherein the phosphate ester is supplied as neutralized by an equivalent of diethanolamine. When the phosphate ester has been neutralized in advance, it need not be combined with an alkanolamine, an ethoxylated alkanolamide, an alkanolamine, or an ethoxylated amine as described immediately below.

2. Alkanolamide, Ethoxylated Alkanolamide, Alkanolamine, or Ethoxylated Amine

The non-aqueous solder flux includes an alkanolamide, an ethoxylated alkanolamide, an alkanolamine, or an ethoxylated amine.

Alkanolamides suitable for use are based on $C_8$-$C_{30}$ fatty acids, preferably $C_{10}$-$C_{18}$ fatty acids such as coco fatty acid, lauric acid, myristic acid, palmitic acid, stearic acid, and oleic acid. The amide portion of the alkanolamide derives from an alkanolamine such as monoethanolamine (MEA), diethanolamine (DEA), or monoisopropanolamine (MIPA). Suitable alkanolamides include, for example, cocamide MEA, cocamide DEA, lauramide MEA, lauramide DEA, cocamide MIPA, lauramide MIPA, oleamide MIPA, oleamide MEA, oleamide DEA, and the like, and mixtures thereof. Suitable alkanolamides are available from Stepan under the NINOL® mark. Examples include NINOL®40-CO, NINOL® 4821C, NINOL® 33-LL, NINOL® 55-LL, NINOL® 96-SL, NINOL® COMF, NINOL® LMP, NINOL® M-10, NINOL® 201, and the like.

Ethoxylated alkanolamides having an average of 2 to 10 units, preferably 4 to 8 EO units, are also suitable for use. In some aspects, the ethoxylated alkanolamide is a PEG cocamide or a PEG lauramide, each having an average of 4 to 8 EO units. Commercially available products from Stepan include, for example, NINOL® C-4 (PEG-5 cocamide), NINOL® C-5 (PEG-6 cocamide), NINOL® 1301 (PEG-6 cocamide), NINOL® L-5 (PEG-6 lauramide), and the like.

Alkanolamines suitable for use include ethanolamine, N-methylethanolamine, N,N-dimethylethanolamine, diethanolamine, triethanolamine, aminomethyl propanol, isopropanolamine, diisopropanolamine, and the like.

Suitable ethoxylated fatty amines are derived from $C_8$-$C_{30}$ fatty acids, preferably $C_{10}$-$C_{18}$ fatty acids such as coco fatty acid, lauric acid, myristic acid, palmitic acid, stearic acid, oleic acid, and mixtures thereof, including, e.g., tallow. In some aspects, the ethoxylated amine is a cocamine ethoxylate, a lauramine ethoxylate, or a tallowamine ethoxylate, each having an average of 2 to 10 EO units, especially 2 to 5 EO units. Commercially available products include ethoxylated cocamines, such as Stepan's TOXIMUL® CA-2 and TOXIMUL® CA-7.5, and ethoxylated tallowamines, such as TOXIMUL® TA-2, TOXIMUL® TA-5, and TOXIMUL® TA-8. TOXIMUL® TA-2, a tallowamine ethoxylate having an average of 2 EO groups, is particularly preferred.

The two principal components of the inventive solder fluxes are usually most effective when combined in roughly equal proportion. Although the mechanism of action is not well understood, the fluxes might function by forming an ion pair that dissociates under shear conditions but rapidly re-forms when shear is discontinued. Thus, in some aspects, the non-aqueous solder flux composition comprises (a) 40 to 60 wt. % of the alkylbenzene sulfonic acid or the acidic phosphate ester; and (b) 40 to 60 wt. % of the alkanolamide, the ethoxylated alkanolamide, the alkanolamine, or the ethoxylated amine. In other aspects, the flux composition comprises (a) 45 to 55 wt. % of the alkylbenzene sulfonic acid or the acidic phosphate ester; and (b) 45 to 55 wt. % of the alkanolamide, the ethoxylated alkanolamide, the alkanolamine, or the ethoxylated amine. In other aspects, the flux composition comprises (a) 48 to 52 wt. % of the alkylbenzene sulfonic acid or the acidic phosphate ester; and (b) 48 to 52 wt. % of the alkanolamide, the ethoxylated alkanolamide, the alkanolamine, or the ethoxylated amine. In each of these aspects, the wt. % amounts are based on the combined amounts of (a) and (b). In other particular aspects, the inventive solder flux compositions may consist essentially of components (a) and (b) in the proportions indicated in this paragraph, where the wt. % amounts are based on the combined amounts of components (a) and (b).

Rheological Characteristics of the Non-Aqueous Solder Flux Compositions

Rheological characteristics of the solder flux compositions can be determined using dynamic shear rheometry (DSR) using any suitable instrument, such as, for instance, a Discovery HR-3 hybrid rheometer. Some of the inventive compositions have the characteristics evident from FIGS. 1-10. FIGS. 1-4, 9, and 10 show DSR plots for inventive compositions having a desirable rheological profile.

Figure 5:
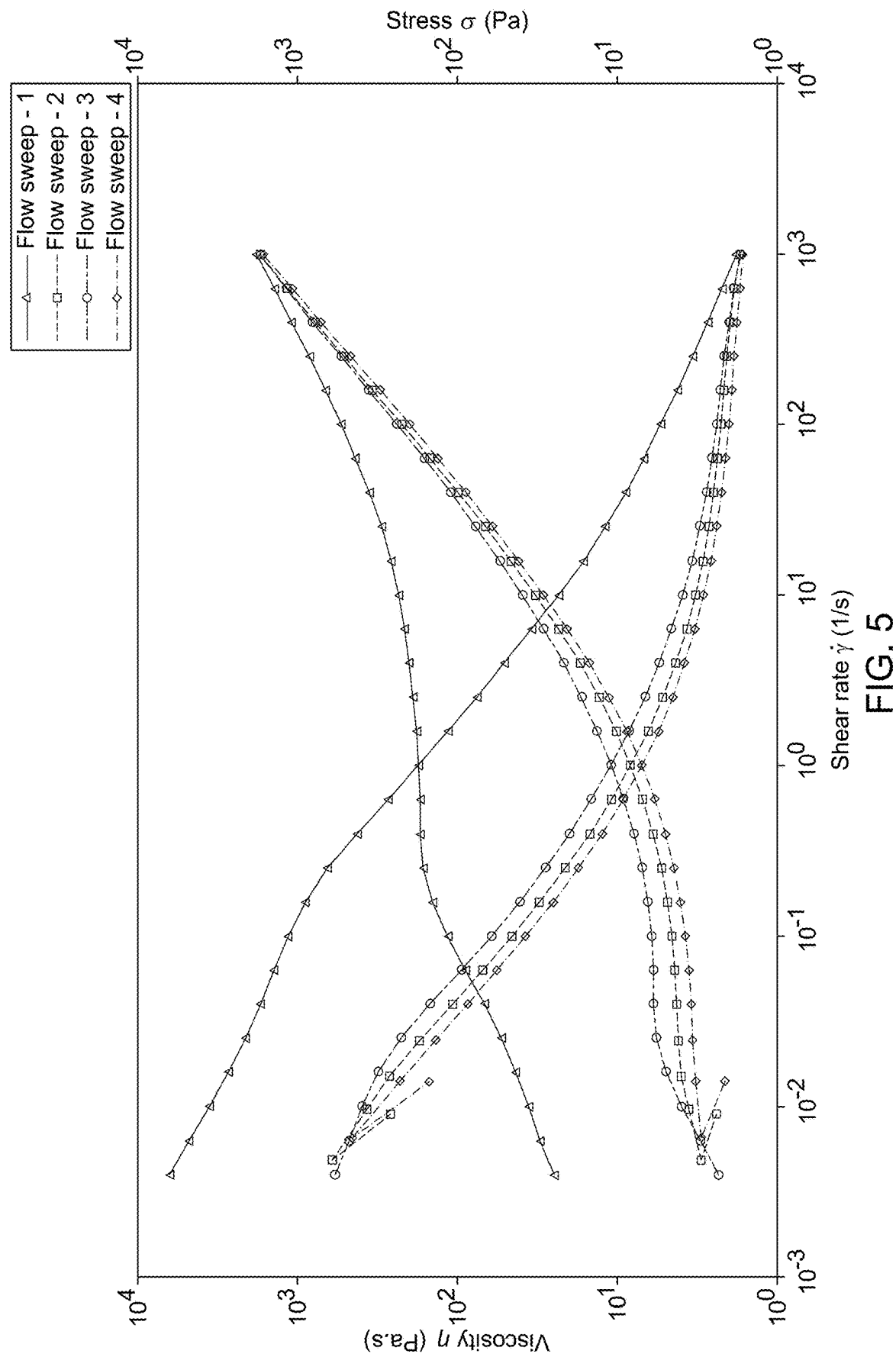
FIG. 5 is a plot from a similar DSR for a 50:50 blend of CEDEPHOS® FA-600 and NINOL® 1301 (cocamide PEG-6).

FIG. 5 illustrates rheological behavior of one of the three inventive but "marginal" compositions, although the other characteristics are acceptable.

Figure 6:
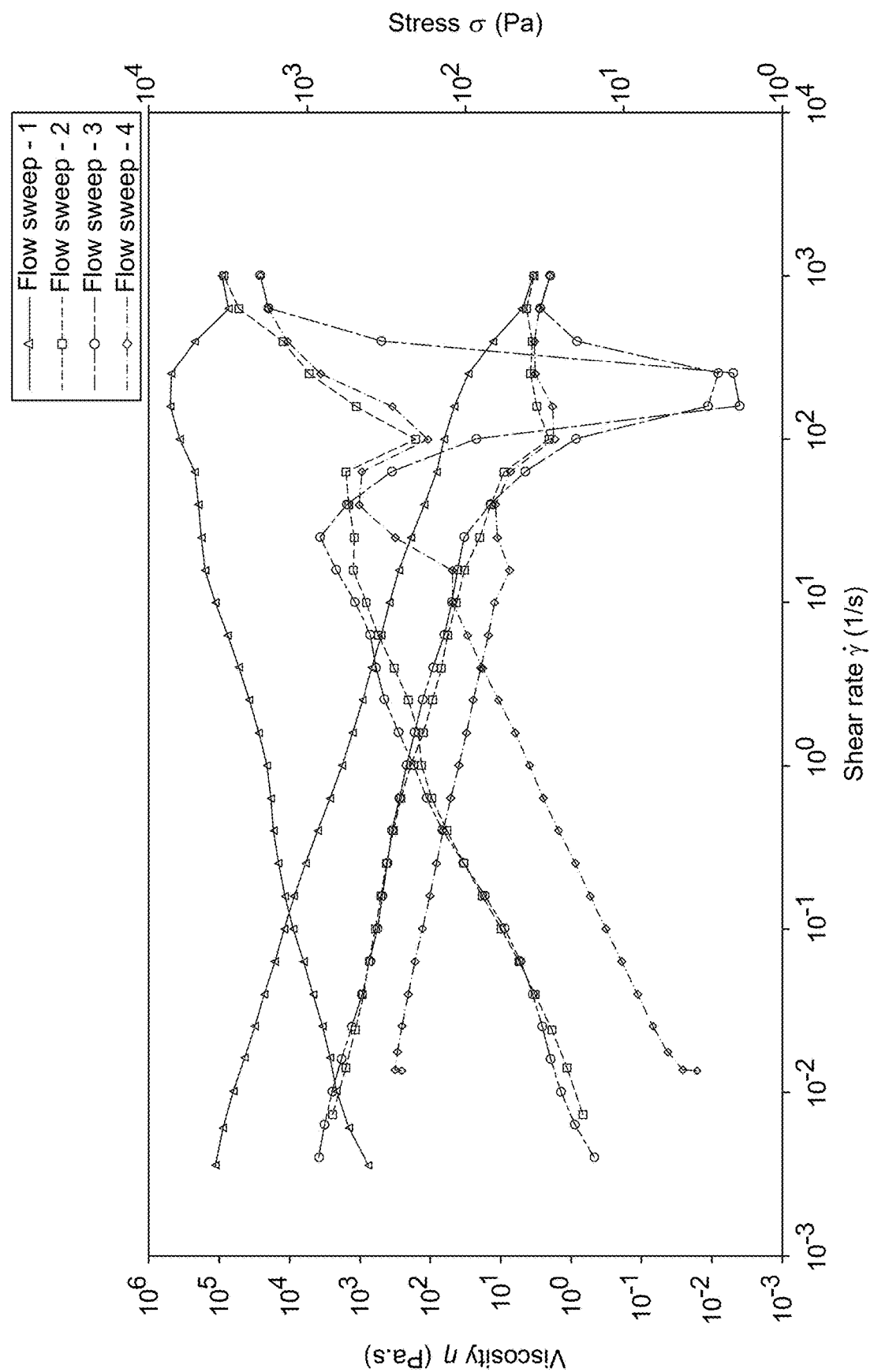
FIG. 6 is a comparative plot from a DSR experiment measuring viscosity versus shear rate for a 60:40 blend of BIO-SOFT® S-126 and TOXIMUL® TA-2.
Figure 7:
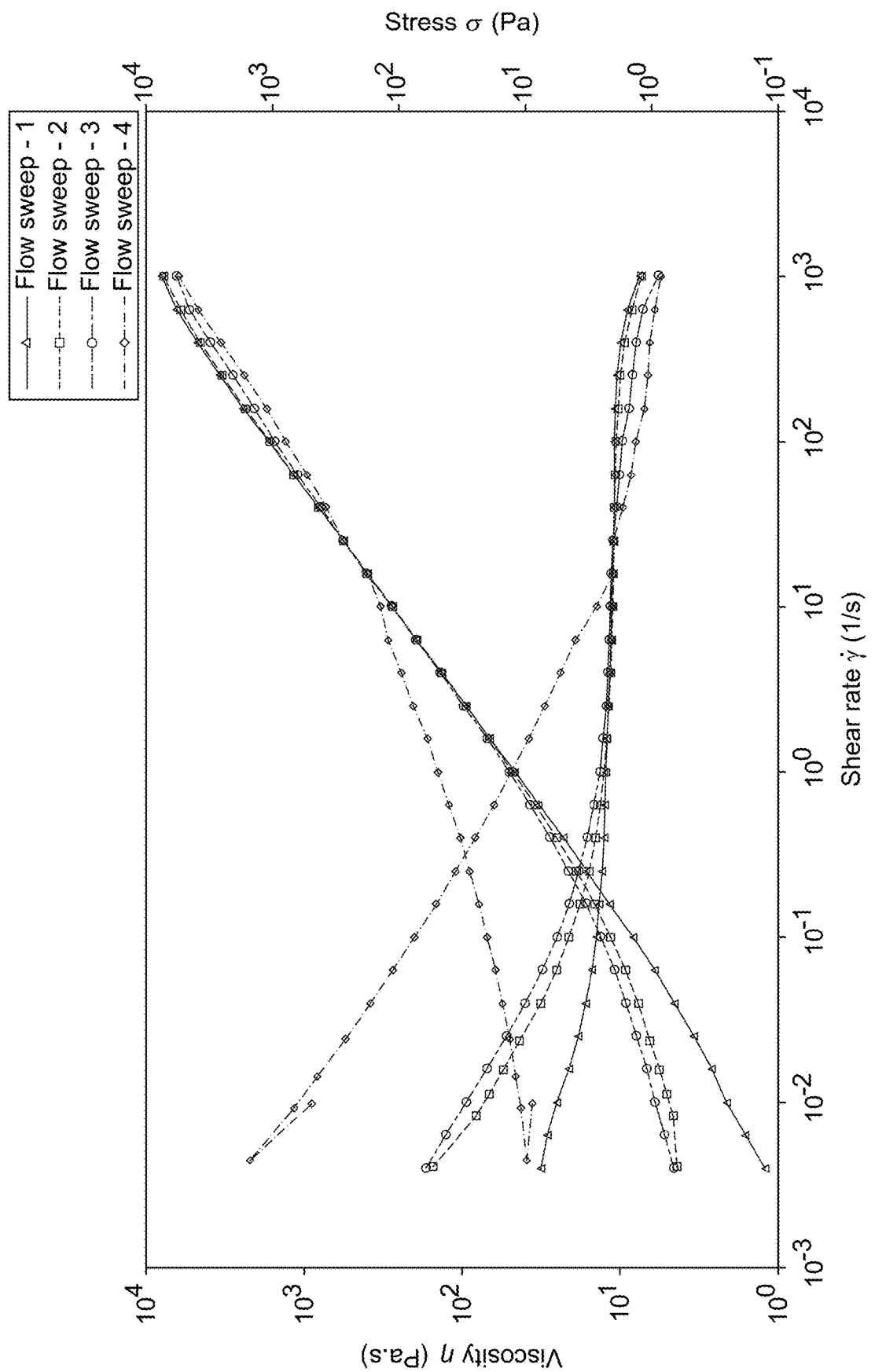
FIG. 7 is a comparative plot from a similar DSR experiment for a 50:50 blend of BIO-SOFT® S-126 and TOXIMUL® TA-5 (tallowamine 5EO ethoxylate).
Figure 8:
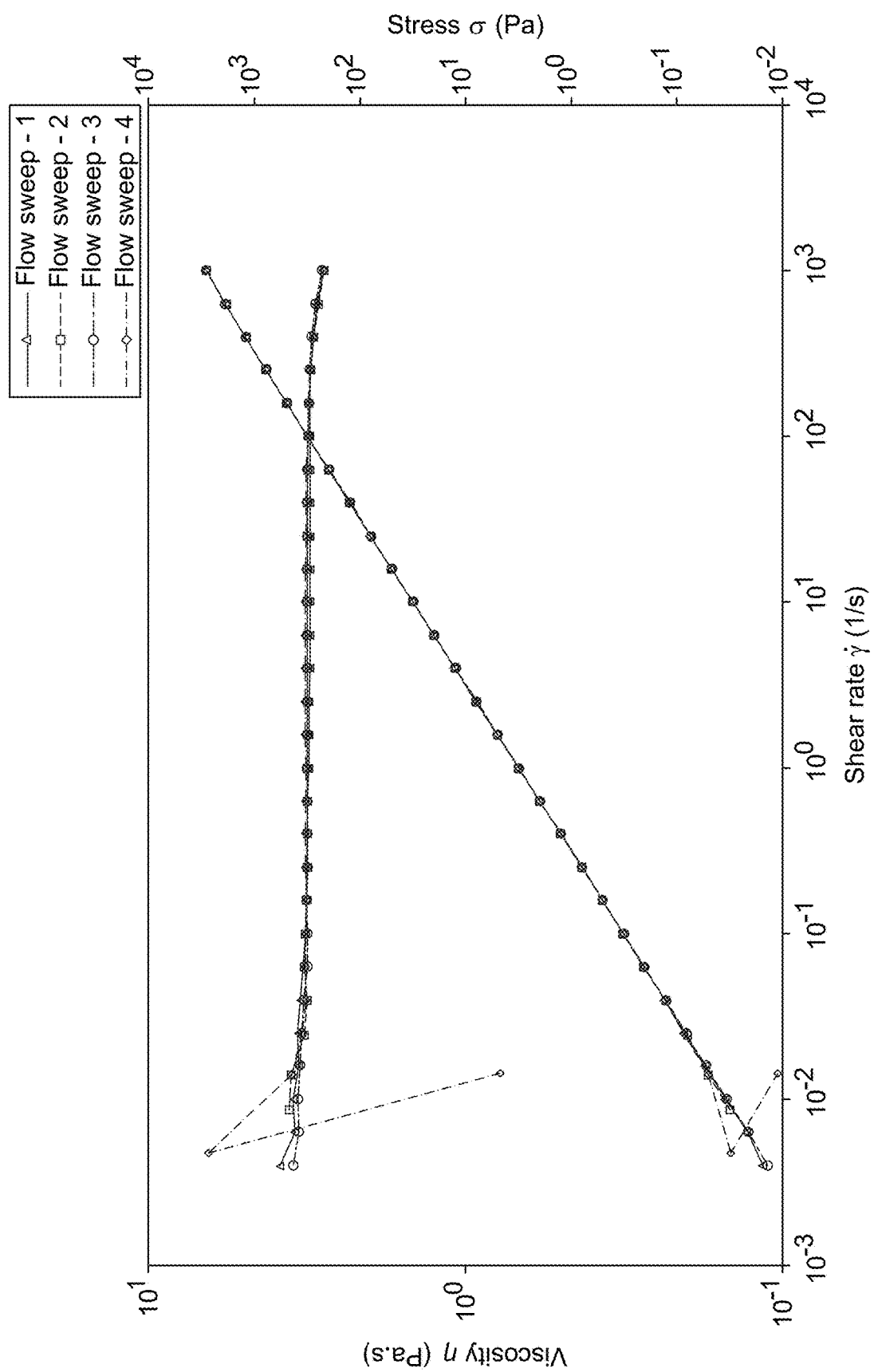
FIG. 8 is a comparative plot from a similar DSR experiment for a 50:50 blend of BIO-SOFT® S-126 and TOXIMUL® TA-15 (tallowamine 15EO ethoxylate).
Figure 9:
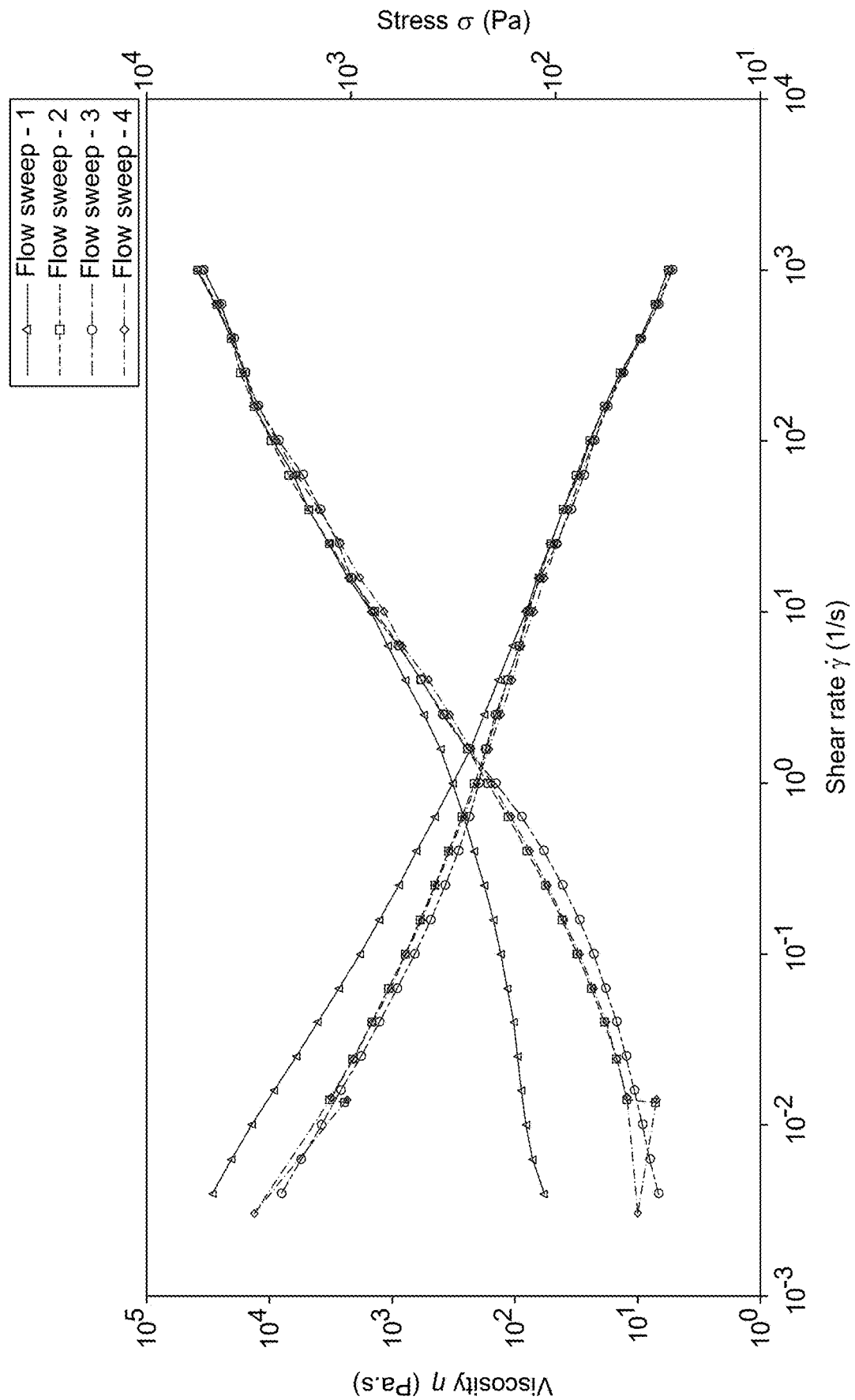
FIG. 9 is a plot from a similar DSR experiment for a 50:50 blend of TOXIMUL® TA-2 and an acidic alcohol phosphate ester produced from MAKON® DA-4 (isodecyl alcohol 4EO ethoxylate).
Figure 10:
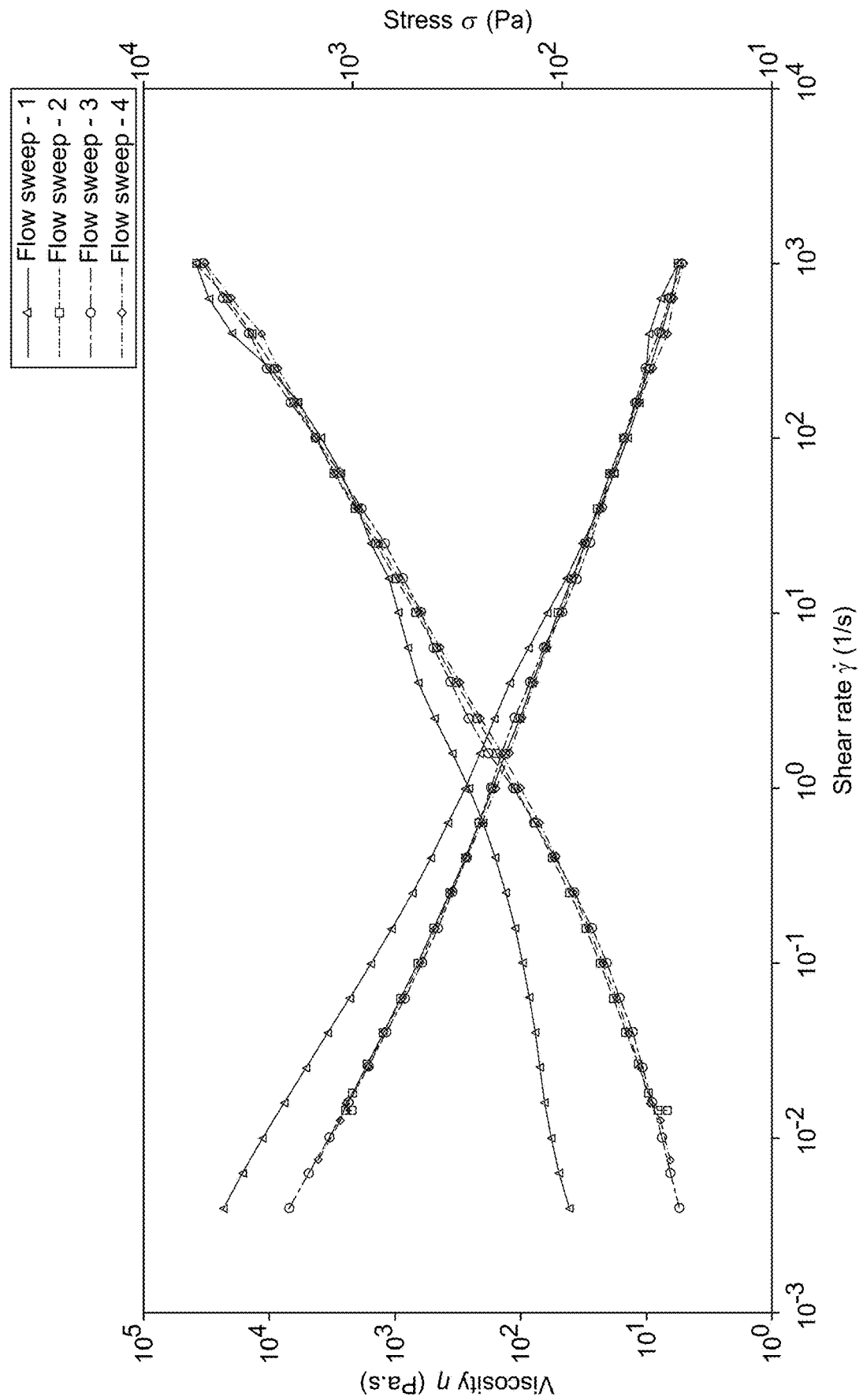
FIG. 10 is a plot from a similar DSR experiment for a 50:50 blend of TOXIMUL® TA-2 and an acidic alcohol phosphate ester produced from MAKON® DA-6 (isodecyl alcohol 6EO ethoxylate).

FIGS. 6-8 show rheological behavior from three of the comparative compositions. In each case, the zero-shear viscosities are much lower. FIG. 6 demonstrates that deviating too much from a 50/50 blend of the same composition of an alkylbenzene sulfonic acid and a tallowamine ethoxylate can convert an otherwise excellent rheological profile (as in FIG. 1) to an unacceptable one (FIG. 6). In some cases, a 50/50 blend with a more highly ethoxylated tallowamine (as in FIGS. 7 and 8) may also interfere with achieving a desirable profile.

Wettability

Solder wetting refers to formation of a relatively uniform film of solder that adheres well to a soldered surface. Solders that fail to wet a metal surface will not adhere well. With a wetting balance solderability test, one can measure wetting forces between a molten solder and a surface to be soldered as a function of time. At time zero, the wetting force can be negative until the flux melts and begins to wet the metal surface, ideally in less than one second. Desirably, the wetting force rapidly increases to a maximum level, then levels off at that high level, preferably at least 0.2 mN/mm, or at least 0.25 mN/mm, for the duration of the test, typically 10 seconds. We found that the inventive solder flux compositions have good wettability on metal coupons, particularly copper coupons, in an industry-standard wetting balance test when compared with a control flux, particularly a halogen-free, rosin-based IPC test flux (see Tables 3-4 and FIGS. 11-14).

In some aspects, fluxes of the invention, when combined with some water, have acidic pH within the range of 1.0 to 6.0 or from 2.0 to 5.0. In general, acidity is desirable in solder fluxes for removing metal oxide impurities from the surface of circuit boards during soldering. We found that the inventive fluxes can remove oxidation from metal surfaces, particularly copper, when melted onto the metal surface. In addition, the oxidized impurities are easily rinsed from the soldered surface with water without leaving behind a dark, sticky residue as is common with some commercial products.

In some aspects, the inventive non-aqueous fluxes are low-VOC or, more preferably, zero-VOC compositions. This contrasts with conventional fluxes, which normally have a substantial solvent component. Known zero-VOC fluxes are typically water-based and generally cannot be used in an oven flow environment. The inventive fluxes therefore combine usefulness at high soldering temperatures with a favorable environmental profile.

The following examples merely illustrate the invention; the skilled person will recognize many variations that are within the spirit of the invention and scope of the claims.

Example 1 Tacky Solder Flux Composition

TOXIMUL® TA-2 (tallowamine 2 EO ethoxylate, product of Stepan, 5.0 g) is warmed to 50° C., then added to BIO-SOFT® S-126 (dodecylbenzene sulfonic acid, product of Stepan, 5.0 g) and mixed well to give a homogeneous mixture.

Examples 2-9 and Comparative Examples 10-17

Table 1 shows the components used to produce additional inventive or comparative tacky solder flux compositions. Except as otherwise indicated, a 50:50 by weight mixture of (a) the alkylbenzene sulfonic acid or acidic phosphate ester; and (b) the alkanolamide, the ethoxylated alkanolamide, the alkanolamine, or the ethoxylated amine is used.

TABLE 1

Solder Flux Compositions

| Ex. | Component (a) | Component (b) |
|---|---|---|
| 1 | BIO-SOFT ® S-126 | TOXIMUL ® TA-2 |
| 2 | ZELEC ® NK | diethanolamine* |
| 3 | ZELEC ® UN | TOXIMUL ® TA-2 |
| 4 | CEDEPHOS ® FA-600 | TOXIMUL ® TA-2 |
| 5 | phosphate ester from MAKON ® DA-4 | TOXIMUL ® TA-2 |
| 6 | phosphate ester from MAKON ® DA-6 | TOXIMUL ® TA-2 |
| 7 | BIO-SOFT ® S-126 (45 wt. %) | TOXIMUL ® TA-2 (55 wt. %) |
| 8 | CEDEPHOS ® FA-600 | NINOL ® 1301 |
| 9 | ZELEC ® UN | NINOL ® 1301 |
| C10 | BIO-SOFT ® S-126 (55 wt. %) | TOXIMUL ® TA-2 (45 wt. %) |
| C11 | BIO-SOFT ® S-126 (60 wt. %) | TOXIMUL ® TA-2 (40 wt. %) |
| C12 | BIO-SOFT ® S-126 | TOXIMUL ® TA-5 |
| C13 | ZELEC ® UN | TOXIMUL CA-7.5 |
| C14 | BIO-SOFT ® S-126 | NINOL ® 1301 |
| C15 | BIO-SOFT ® S-126 | NINOL ® CA-7.5 |
| C16 | BIO-SOFT ® S-126 | TOXIMUL ® TA-15 |
| C17 | BIO-SOFT ® S-126 | NINOL ® C-5 |

*diethanolamine is included as a neutralizing agent in ZELEC ® NK.

Rheology Testing

Rheology properties of a small sample are determined using a Discovery HR-3 hybrid rheometer (TA Instruments) running Trios v4.2.1.36612 software. Geometry: 40-mm parallel plate, Peltier plate steel. Oscillation rate: 10 rad/s. Temperature: 25° C. The shear rate is varied from $1.0 \times 10^{-3}$ $s^{-1}$ to $1.0 \times 10^{3}$ $s^{-1}$, then from $1.0 \times 10^{3}$ $s^{-1}$ to $1.0 \times 10^{-3}$ $s^{-1}$. for the initial sweep. After a one-minute pause, the process is repeated for a second complete cycle.

Results appear in Table 2. As shown in the table, some of the samples (Examples 1-6, see also FIGS. 1-4, 9, and 10) exhibit desirable rheological profiles, each having zero-shear viscosities of at least $1.0 \times 10^{4}$ Pa·s, and each exhibiting good shear thinning in the frequency range of 1 $s^{-1}$ to 10 $s^{-1}$. Examples 7-9 are otherwise favorable but have marginal zero-shear viscosities of about $1.0 \times 10^3$ Pa·s, which may be acceptable (or even highly desirable) for some applications. The combinations shown in Comparative Examples 10-17 fail to provide a high enough zero shear viscosity to meet is the needs for a good tacky solder flux. It is apparent that it is not easy to predict which combination of components will produce the most desirable rheological profile. However, it is also apparent that very desirable rheological profiles can be generated with a variety of combinations of the alkylbenzene sulfonic acids or acidic phosphate esters and certain alkanolamides, ethoxylated alkanolamides, alkanolamines, or ethoxylated amines. Some degree of experimentation is desirable for optimizing the formulations.

TABLE 2

Qualitative Rheology Summary

| Flux Ex. | Zero-shear viscosity, Pa·s | Sag | Viscosity at shear rate 1 $s^{-1}$ to 10 $s^{-1}$ (Pa·s) | Profile reproducibility at shear rate 1 to 10 $s^{-1}$ | Comment |
|---|---|---|---|---|---|
| 1 | $1.0 \times 10^4$ | v. low | 100-500 | excellent | desired profile |
| 2 | $1.0 \times 10^4$ | v. low | 75-200 | excellent | desired profile |
| 3 | $1.0 \times 10^4$ | v. low | 75-200 | excellent | desired profile |
| 4 | $1.0 \times 10^4$ | v. low | 50-200 | excellent | desired profile |
| 5 | $1.0 \times 10^4$ | v. low | 75-200 | excellent | desired profile |
| 6 | $1.0 \times 10^4$ | v. low | 75-200 | excellent | desired profile |
| 7 | $1.0 \times 10^3$ | low | 10-200 | good | marginal zero-shear viscosity |
| 8 | $1.0 \times 10^3$ | low | 5-20 | good | marginal zero-shear viscosity |
| 9 | $1.0 \times 10^3$ | low | 5-10 | good | marginal zero-shear viscosity |
| C10 | $1.0 \times 10^2$ | N/A | N/A | N/A | unacceptable zero-shear viscosity |
| C11 | $1.0 \times 10^2$ | N/A | N/A | N/A | unacceptable zero-shear viscosity |
| C12 | $1.0 \times 10^2$ | N/A | N/A | N/A | unacceptable zero-shear viscosity |
| C13 | $<1 \times 10^2$ | N/A | N/A | N/A | unacceptable zero-shear viscosity |
| C14 | 10 | N/A | N/A | N/A | unacceptable zero-shear viscosity |
| C15 | 10 | N/A | N/A | N/A | unacceptable zero-shear viscosity |
| C16 | <10 | N/A | N/A | N/A | unacceptable zero-shear viscosity |
| C17 | <10 | N/A | N/A | N/A | unacceptable zero-shear viscosity |

Wetting Balance Test

Three of the inventive test flux compositions (from Examples 1, 2, and 4 above) and a control flux (IPC Test Flux #2, a ROLO 0.5% activated flux) are evaluated in SAC 305 alloy (a lead-free solder containing 96.5% tin, 3% silver, and 0.5% copper) using a Metronelec ST50 wetting balance. Perfect copper foil coupons (10 mm×10 mm) are used as the test vehicle. To prepare the coupons, a sheet of 1-oz copper foil is etched to remove the chromate coating. The etched foil is stamped using a die to remove the coupons, which are then washed in acetone and dried. Samples are immersed in test flux or are coated with an artist paintbrush, with any excess flux removed by blotting.

Samples are placed in a tool holder, placed into the sensor head, and the sample is immersed for 10 seconds at 90 degrees to the surface of the alloy. For each of the fluxes, values of wetting force (mN/mm) versus time (seconds) are recorded for the 10-second duration of the test for each of ten test samples. FIGS. 11-14 plot the average values from ten test runs. The force values from the test are generally reliable to ±0.002 mN/mm. Results from the test appear in Table 3 and FIGS. 11-14.

TABLE 3

Wettability Results (average of 10 trials)

| Flux Sample | Time to cross 0 mN/mm, s | Force, mN/mm at 2 s | Force, mN/mm at 5 s | Force, mN/mm at 10 s | Pass/Fail |
|---|---|---|---|---|---|
| 1 | 0.26 | 0.28 | 0.28 | 0.27 | pass |
| 2 | 0.28 | 0.26 | 0.25 | 0.24 | pass |
| 4 | 0.28 | 0.23 | 0.23 | 0.22 | pass |
| Control | instant | 0.29 | 0.29 | 0.28 | pass |

Figure 11:
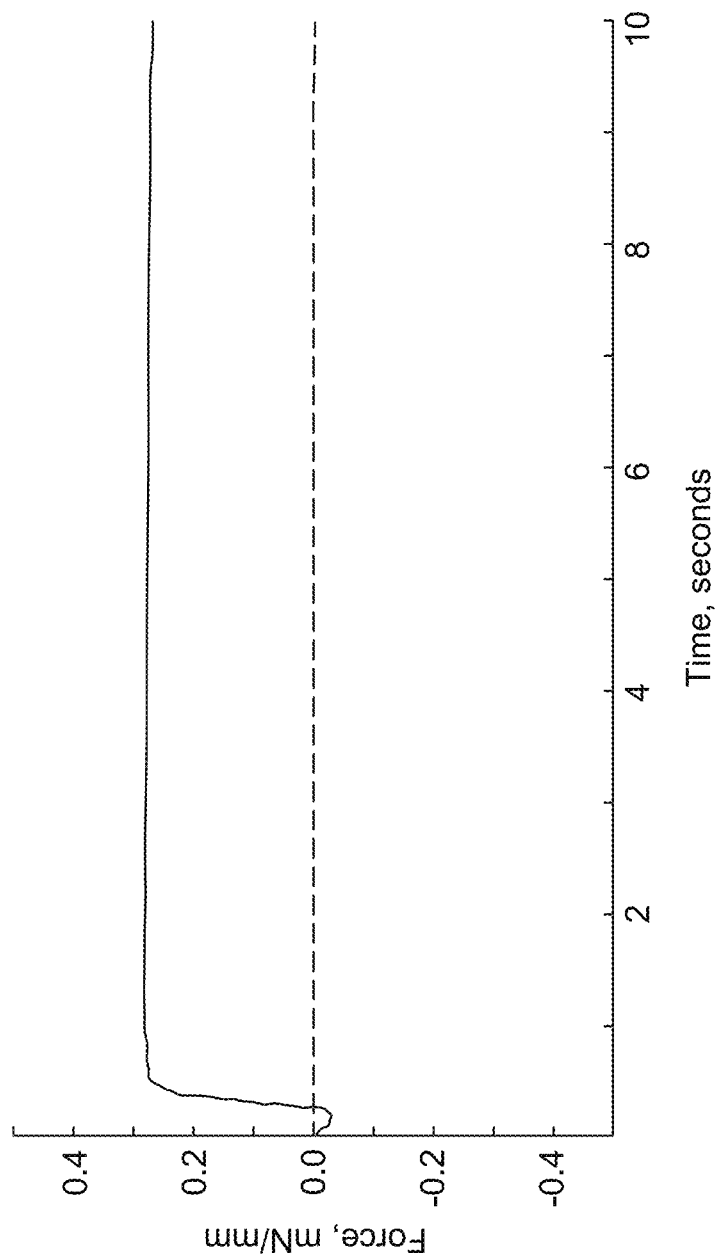
FIG. 11 shows results from a wetting balance test using a copper coupon, a SAC 305 lead-free alloy solder, and the inventive solder flux of Example 1.
Figure 12:
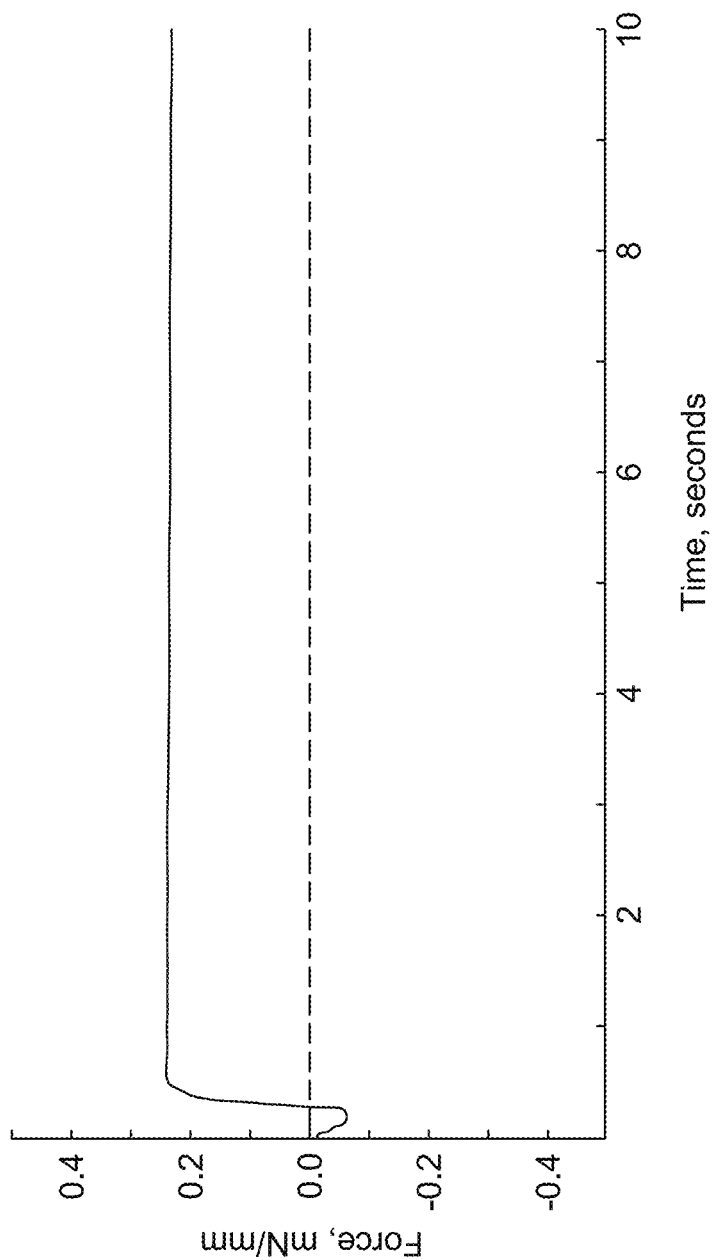
FIG. 12 shows results from a wetting balance test using a copper coupon, a SAC 305 lead-free alloy solder, and the inventive solder flux of Example 4.
Figure 13:
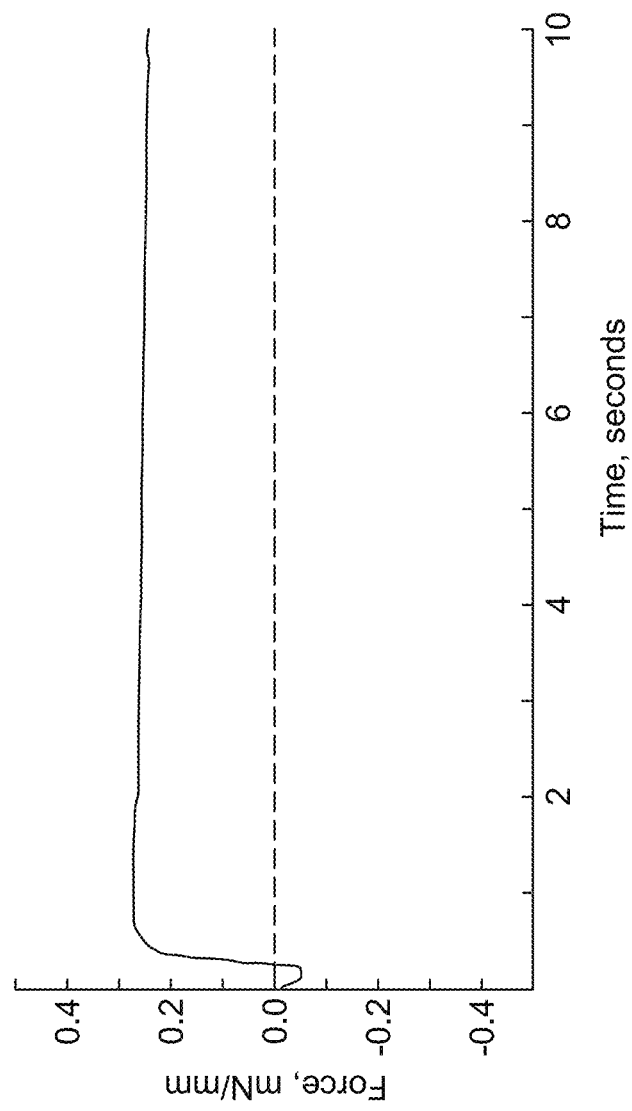
FIG. 13 shows results from a wetting balance test using a copper coupon, a SAC 305 lead-free alloy solder, and the inventive solder flux of Example 2.
Figure 14:
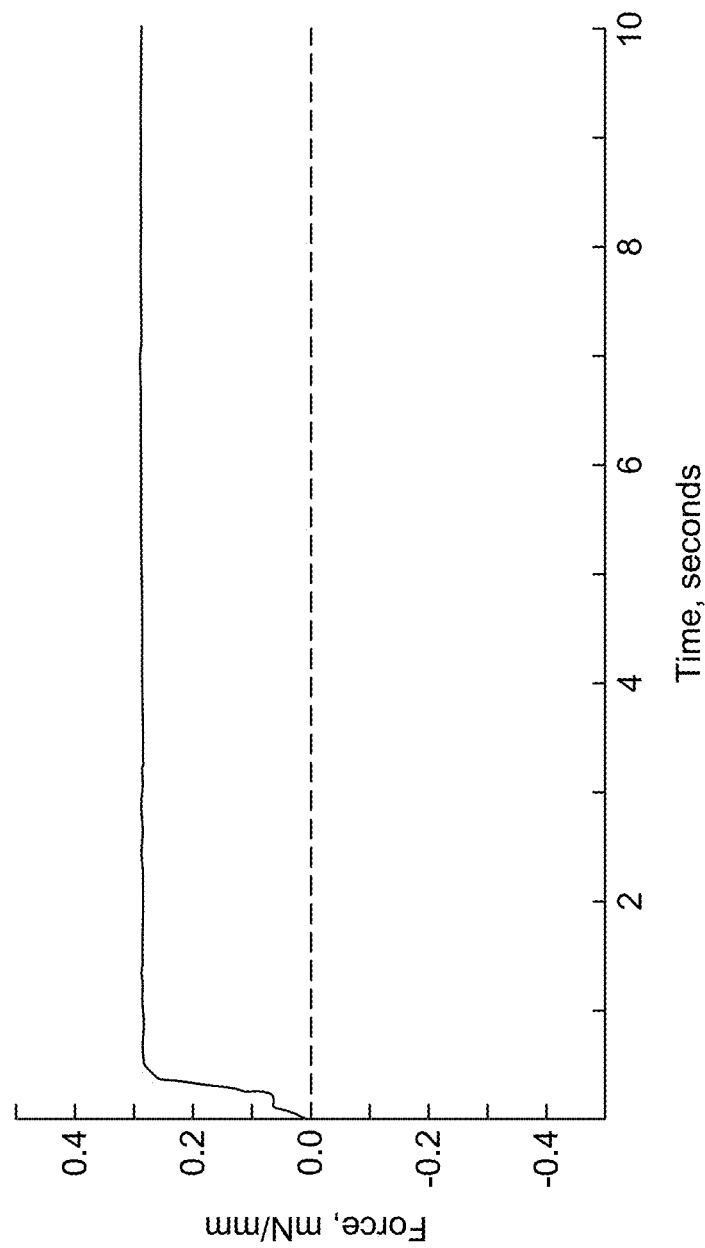
FIG. 14 shows results from a wetting balance test using a copper coupon, a SAC 305 lead-free alloy solder, and a comparative IPC test flux.

As shown in FIGS. 11-13 and Examples 1, 2, and 4, each of the inventive fluxes has good wettability and is comparable to the control flux (FIG. 14). The inventive fluxes melt within 0.3 s and rapidly achieve a maximum, sustained wetting force. The control flux needs no time to cross the 0 mN/mm value, but as a practical matter, a brief delay due to melting as evident in Examples 1, 2, and 4 is acceptable and does not interfere with processing.

Additional experiments are performed using the wetting balance test described above. Flux samples 8 and 9 are evaluated versus a control sample. Each of these samples passes the wettability test (see Table 4). In another set of experiments, the procedure described above is followed except that the coupons are stressed following stamping of the foils by baking them in an oven at 155° C. for 16 h. Only the coupons treated with flux samples 2 and 9 pass this rigorous test (Table 4); even the control sample is unable to pass the test.

TABLE 4

Wettability Results (average of 10 trials)

| Flux Sample | Time to cross 0 mN/mm, s | Force, mN/mm at 2 s | Force, mN/mm at 5 s | Force, mN/mm at 10 s | Pass/Fail |
|---|---|---|---|---|---|
| Unstressed samples | | | | | |
| 8 | 0.26 | 0.27 | 0.25 | 0.24 | pass |
| 9 | 0.27 | 0.24 | 0.23 | 0.23 | pass |
| Control | instant | 0.28 | 0.29 | 0.29 | pass |
| Stressed samples (155° C., 16 h) | | | | | |
| 1 | 4.9 | 0.01 | 0.21 | 0.25 | fail |
| 2 | 0.7 | 0.25 | 0.24 | 0.23 | pass |
| 4 | 2.3 | 0.18 | 0.23 | 0.22 | fail |
| 8 | 1.0 | 0.16 | 0.22 | 0.21 | fail* |
| 9 | 1.3 | 0.19 | 0.22 | 0.21 | pass |
| Control | N/A | −0.38 | −0.36 | −0.34 | fail |

*Sample defects observed despite otherwise favorable results

Thermogravimetric Analysis

A Discovery TGA thermogravimetric analyzer (TA Instruments) is used to evaluate weight loss as a function of temperature for several of the inventive non-aqueous solder flux compositions. Samples are heated on platinum sample pans at 25° C./min from room temperature to 600° C. Data is analyzed using TRIOS software, version 2.2.0.3877. For each sample evaluated, the onset of weight loss begins at temperatures between about 175° C. and 250° C. Results appear in Table 5. The measured weight loss at 250° C. varies considerably for the inventive fluxes. Like conventional fluxes, ZELEC NK loses 50% or more of its weight through evaporation at 250° C. If more of the solder flux needs to be maintained at temperatures above 250° C., a sulfonic acid-based flux can be used. The different formulations provide some flexibility regarding how much flux will remain at 250° C., and the desired amount of flux residue will depend on the specific application.

TABLE 5

Thermogravimetric Analysis (TGA) Data

| Flux Ex. | Flux composition | Wt. % of sample remaining at 250° C. |
|---|---|---|
| 1 | BIO-SOFT ® S-126/TOXIMUL ® TA-2 (50/50) | 96 |
| 2 | ZELEC ® NK (diethanolamine) | 41 |
| 3 | ZELEC ® UN/TOXIMUL ® TA-2 | 61 |
| 4 | CEDEPHOS ® FA-600/TOXIMUL ® TA-2 | 60 |
| 5 | BIO-SOFT ® S-126/TOXIMUL ® TA-2 (45/55) | 92 |

Solderability Test

The solder flux of Example 2 is evaluated in a lead-free solderability test. An oxidized copper coupon is treated on one half with a commercial lead-free tinning flux. The other half of the coupon is treated with the solder flux of Example 2. After applying the fluxes, the coupon is gently heated to melt the fluxes. Upon melting, the flux of Example 2 is observed to remove the oxidized coating from the coupon, while the other side of the coupon remains dark from oxidation. Once the fluxes have melted, equal amounts of a lead-free solder (tin/silver alloy) are applied to each side of the coupon. The coupon is heated until the solder melts. Upon cool down, the coupons are rinsed with water, and the amount of residue is evaluated. The flux of Example 2 is easily removed by rinsing, while the commercial product leaves behind a dark, sticky residue. In both cases, the solder bead is well-bonded to the copper coupon.

The preceding examples are meant only as illustrations; the following claims define the scope of the invention.

We claim:

1. A composition comprising:
   (a) 40 to 60 wt. % of an acidic phosphate ester; and
   (b) 40 to 60 wt. % of an alkanolamide, an ethoxylated alkanolamide, or an ethoxylated amine;
   said wt. % amounts based on the combined amounts of (a) and (b);
   wherein the composition is a non-aqueous solder flux;
   wherein the ethoxylated amine is a cocamine ethoxylate, a lauramine ethoxylate, or a tallowamine ethoxylate, each having an average of 2 to 5 EO units.

2. The composition of claim 1 wherein the acidic phosphate ester is a phosphate ester of an ethoxylated isodecyl alcohol, an ethoxylated tridecyl alcohol, an ethoxylated tristyrylphenol, or an ethoxylated nonylphenol.

3. The composition of claim 1 wherein the alkanolamide is cocamide MEA, cocamide DEA, lauramide MEA, lauramide DEA, oleamide MEA, oleamide DEA, cocamide MIPA, lauramide MIPA, or oleamide MIPA.

4. The composition of claim 1 wherein the ethoxylated alkanolamide is a PEG cocamide or a PEG lauramide, either having an average of 4 to 8 EO units.

5. The composition of claim 1 wherein the composition has good wettability on metal coupons in a wetting balance test as described herein compared with that of a control flux as evidenced by a wetting force that is generated within 1 second from the start of the test, and is sustained for at least 10 seconds, of greater than 0.2 mN/mm.

6. The composition of claim 1, that upon dilution with water, has a pH within the range of 1.0 to 6.0.

7. A mixture comprising solder and the composition of claim 1.

* * * * *